US011239985B2

(12) United States Patent
Jin et al.

(10) Patent No.: US 11,239,985 B2
(45) Date of Patent: Feb. 1, 2022

(54) ECHO CANCELLATION IN MULTIPLE PORT FULL DUPLEX (FDX) NODES AND AMPLIFIERS

(71) Applicant: Cisco Technology, Inc., San Jose, CA (US)

(72) Inventors: Hang Jin, Plano, TX (US); John T. Chapman, Orange, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/385,920

(22) Filed: Apr. 16, 2019

(65) Prior Publication Data
US 2020/0336280 A1   Oct. 22, 2020

(51) Int. Cl.
  *H04L 5/14* (2006.01)
  *H04L 12/64* (2006.01)
  *H04B 10/2575* (2013.01)
  *H04B 10/25* (2013.01)

(52) U.S. Cl.
  CPC ....... *H04L 5/1461* (2013.01); *H04B 10/2589* (2020.05); *H04B 10/25751* (2013.01); *H04L 12/6418* (2013.01); *H04L 2012/6421* (2013.01); *H04L 2012/6491* (2013.01)

(58) Field of Classification Search
  None
  See application file for complete search history.

(56) References Cited

U.S. PATENT DOCUMENTS

| 4,072,830 | A  | * | 2/1978  | Gitlin   | H04B 3/232  |
|           |    |   |         |          | 370/289     |
| 5,214,955 | A  | * | 6/1993  | Yost     | G01N 29/075 |
|           |    |   |         |          | 374/119     |
| 5,942,688 | A  | * | 8/1999  | Kimura   | G01N 29/348 |
|           |    |   |         |          | 73/598      |
| 6,307,905 | B1 | * | 10/2001 | Agazzi   | G01R 31/3004|
|           |    |   |         |          | 370/516     |
| 10,541,723| B2 | * | 1/2020  | Jin      | H04B 3/20   |
| 2013/0090080 | A1 | * | 4/2013 | Schmidt | H03H 9/54   |
|           |    |   |         |          | 455/307     |
| 2014/0266901 | A1 | * | 9/2014 | Klemes  | H01Q 21/22  |
|           |    |   |         |          | 342/372     |
| 2015/0009867 | A1 | * | 1/2015 | Choi    | H04L 25/00  |
|           |    |   |         |          | 370/278     |
| 2015/0189423 | A1 | * | 7/2015 | Giannuzzi | H04R 17/02 |
|           |    |   |         |          | 381/74      |
| 2016/0344574 | A1 | * | 11/2016 | Choi   | H04W 74/0816|
| 2017/0187099 | A1 | * | 6/2017 | Patel   | H01Q 3/40   |
| 2017/0194992 | A1 | * | 7/2017 | Kim     | H04B 7/08   |
| 2017/0230033 | A1 | * | 8/2017 | Shapiro | H03H 7/20   |

(Continued)

*Primary Examiner* — Christopher T Wyllie
(74) *Attorney, Agent, or Firm* — Merchant & Gould P.C.

(57) ABSTRACT

Echo cancellation in multiple port Full Duplex (FDX) nodes and amplifiers may be provided. First, a plurality of signals may be provided to a cancelation device. Each of the plurality of signals may be configured to provide the cancelation device with a corresponding plurality of configurations. Next, a plurality of effective echo power values respectively corresponding to the plurality of configurations may be received. A one of the plurality of configurations corresponding to a lowest of the plurality of effective echo power values may then be selected. The cancelation device may then be operated at the selected one of the plurality of configurations.

17 Claims, 5 Drawing Sheets

(56) References Cited

U.S. PATENT DOCUMENTS

| | | | |
|---|---|---|---|
| 2018/0084506 A1* | 3/2018 | Min | H04W 52/146 |
| 2018/0294853 A1* | 10/2018 | Mochida | H04B 7/0456 |
| 2019/0013580 A1* | 1/2019 | Vigano | H01Q 1/2283 |
| 2019/0326949 A1* | 10/2019 | Jin | H04B 1/525 |
| 2019/0379423 A1* | 12/2019 | Jin | H04B 10/25 |
| 2020/0333431 A1* | 10/2020 | Volkel | H01Q 15/0086 |
| 2020/0403689 A1* | 12/2020 | Rofougaran | H04B 7/165 |

\* cited by examiner

ECHO CANCELLATION IN MULTIPLE PORT FULL DUPLEX (FDX) NODES AND AMPLIFIERS

TECHNICAL FIELD

The present disclosure relates generally to echo suppression or cancelation.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
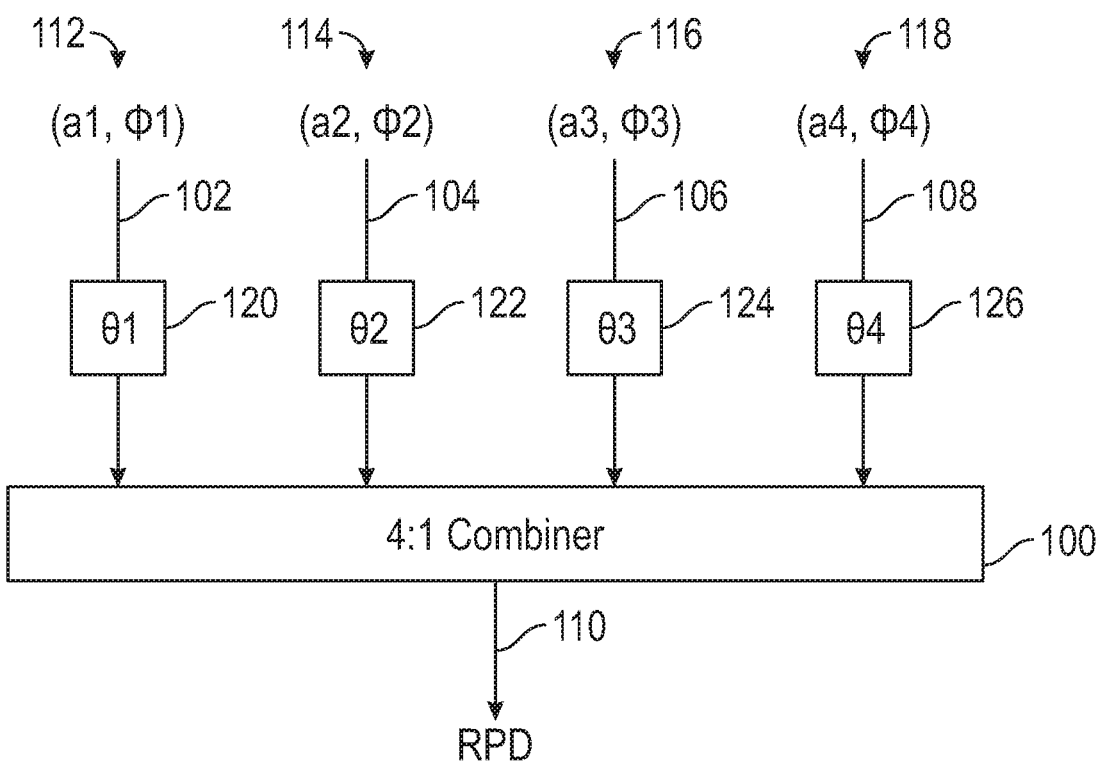
FIG. 1 is a block diagram of a combining system.

Echo cancellation in multiple port Full Duplex (FDX) nodes and amplifiers may be provided. First, a plurality of signals may be provided to a cancelation device. Each of the plurality of signals may be configured to provide the cancelation device with a corresponding plurality of configurations. Next, a plurality of effective echo power values respectively corresponding to the plurality of configurations may be received. A one of the plurality of configurations corresponding to a lowest of the plurality of effective echo power values may then be selected. The cancelation device may then be operated at the selected one of the plurality of configurations.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. These systems may include HFC networks. To amplify upstream (US) signals and downstream (DS) signals in the HFC network, MSOs may use nodes deployed within the HFC. In the HFC network, a node may comprise a container that may house optical and electrical circuitry. An optical fiber cable or a coaxial cable may be connected to an input side of the node and a plurality of coaxial cables may be connected to a output side of the node. The input side of the node may be connect to a headend in the HFC network and the DS side of the node may be connected to Customer Premises Equipment (CPE) of subscribers to the HFC.

Fiber Deep (FD) may comprise a trend in which MSOs push fiber ever closer to customers to provide them with better service. In order to provide FD, many Data Over Cable Service Interface Specification (DOCSIS) compliant Hybrid Fiber-Coaxial (HFC) devices (i.e., network elements) may be deployed onto an FD HFC network. These deployed devices may comprise, for example, Full Duplex (FDX) Remote PHY (RPD) nodes and FDX amplifiers. FDX RPD nodes and FDX amplifiers may amplify bi-directional full duplex traffic on the HFC that may share frequency spectrum in both the US direction and the DS direction on the HFC. Non FDX RPD nodes and Non FDX amplifiers may not share frequency spectrum.

FDX amplifiers may utilize coaxial cables on both an input side and an output side. As opposed to FDX amplifiers, FDX RPD nodes may send and receive signals from the MSO headend via fiber optic cable on the input side rather than via coaxial cable, but may use coaxial cables on the output side. Accordingly, FDX RPD nodes may be located at a junction of a fiber plant and a coaxial plant in the HFC network. Furthermore, FDX RPD nodes may include remote PHY circuitry that may implement the physical layer functionality that was conventionally performed at a Cable Modem Termination System (CMTS) located at the headend operated by the MSO FDX operation may introduce co-channel interference (i.e., echoes). For example, echoes of the DS signal may be reflected onto the US signal at the output ports of an FDX node or amplifier. These echoes need to be mitigated (e.g., canceled) to ensure proper FDX operations. There may be two echo cancellation (EC) techniques: analog EC and digital EC. Both of these techniques may depend on Analog to Digital Converter (ADC) and Digital to Analog Converter (DAC) performance. Embodiments of the disclosure may provide a process that may cancel echoes in the Radio Frequency (RF) domain, may not depend on ADC or DAC performance, and, combined with analog/digital EC, may improve overall EC performance.

Embodiments of the disclosure may select, for example, two-way combiner/splitters used in FDX nodes/amplifiers and connect them in such a way that the phases of the echoes at an RPD receiver or amplifier EC module resulting from multiple ports may be scrambled over 360 degree. Echoes with scrambled phases may not combine coherently. Rather they may cancel out each other.

The phases of two way combiners/splitters may be varied, and for each phase combination, the total effective echo power at the FDX receiver may be detected, and the phase combination that yields the lowest echo power may be selected. This varying echo phases and then selecting the best phase combination for the lowest echo power may be referred to as hardware EC. Hardware EC may be more feasible/effective for the echoes resulting from node/amp internal couplings/reflections with similar/consistent phases among the ports.

FIG. 1 is a block diagram of a combining system used to illustrate the aforementioned phase scrambling process. As shown in FIG. 1, the combining system may comprise a combiner 100 that may comprise a plurality of input ports. The plurality of input ports may comprise a first input port 102, a second input port 104, a third input port 106, and a fourth input port 108. Combiner 100 may also comprise an output port 110. While FIG. 1 shows combiner 100 has having four input ports (i.e., 4:1 combiner), embodiments of the disclosure are not limited to four input ports and may comprise any number of input ports. The plurality of input ports may comprise the output ports of an FDX node or FDX amplifier. Combiner 100 may combine US signals received from CPE at the plurality of input ports and output the combined signal on output port 110.

Because the plurality of input ports may also be used to transmit a DS signal to CPE, echoes of the DS signal may be reflected onto the US signal at the plurality of input ports. These echoes may comprise a first echo 112 at first input port 102, a second echo 114 at second input port 104, a third echo 116 at third input port 106, and a fourth echo 118 at fourth input port 108. The echoes may be represented as (ai, ϕi), where ai is the magnitude, ϕi is the phase, and i=1, 2, 3, 4. θi is the phase shift for ith port, θi=0° or 180°, for i=1, 2, 3, 4. For illustration, the 4:1 combiner in FIG. 1 may comprise an in-phase combiner and the phase shifting may be performed by a plurality of phase shifters (e.g., a first phase shifter 120, a second phase shifter 122, a third phase shifter 124, and a fourth phase shifter 126).

Figure 2:
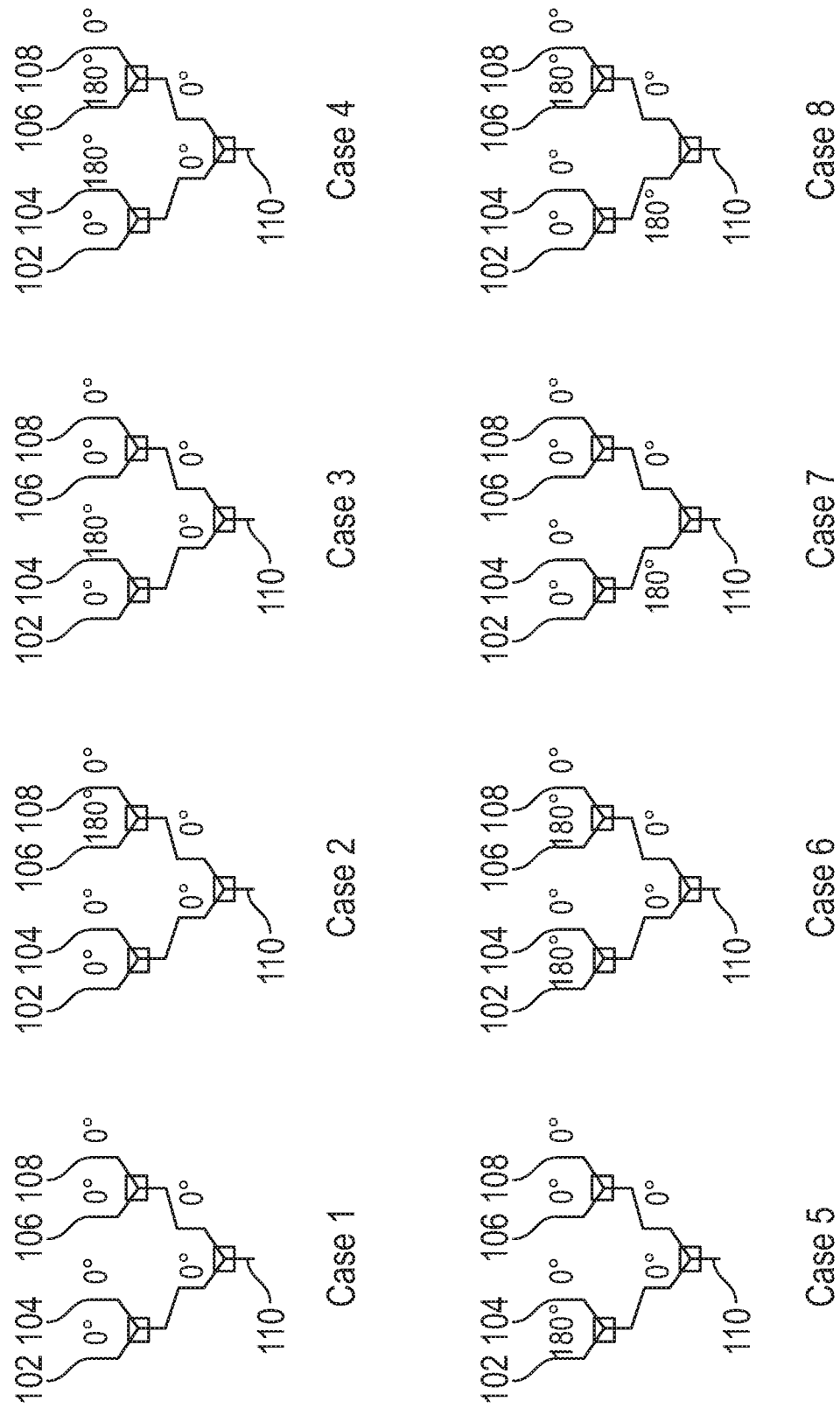
FIG. 2 illustrates a plurality of cases.

In order to perform the aforementioned phase scrambling, plurality of phase shifters may be operated to place the system of FIG. 1 into a plurality of different configurations. These different configurations may comprise, but are not limited to, eight different configurations (i.e., cases) shown in FIG. 2. Two-way combiner/splitters may be connected in such a way to produce the different cases of FIG. 2. For example, all phases may be relative to fourth input port 108 (i.e., θ4=0). The phase shifts performed by the plurality of phase shifters may comprise the following where 0 and 1 respectively represent a 0° and a 180° phase shift. (θ1, θ2, θ3, θ4)=

(0, 0, 0, 0) case 1
(0, 0, 1, 0) case 2
(0, 1, 0, 0) case 3
(0, 1, 1, 0) case 4
(1, 0, 0, 0) case 5
(1, 0, 1, 0) case 6
(1, 1, 0, 0) case 7
(1, 1, 1, 0) case 8

Consistent with embodiments of the disclosure, for each phase combination shown for each case, the total effective echo power at output port 110 may be detected, and the phase combination that yields the lowest echo power may be selected.

Figure 3:
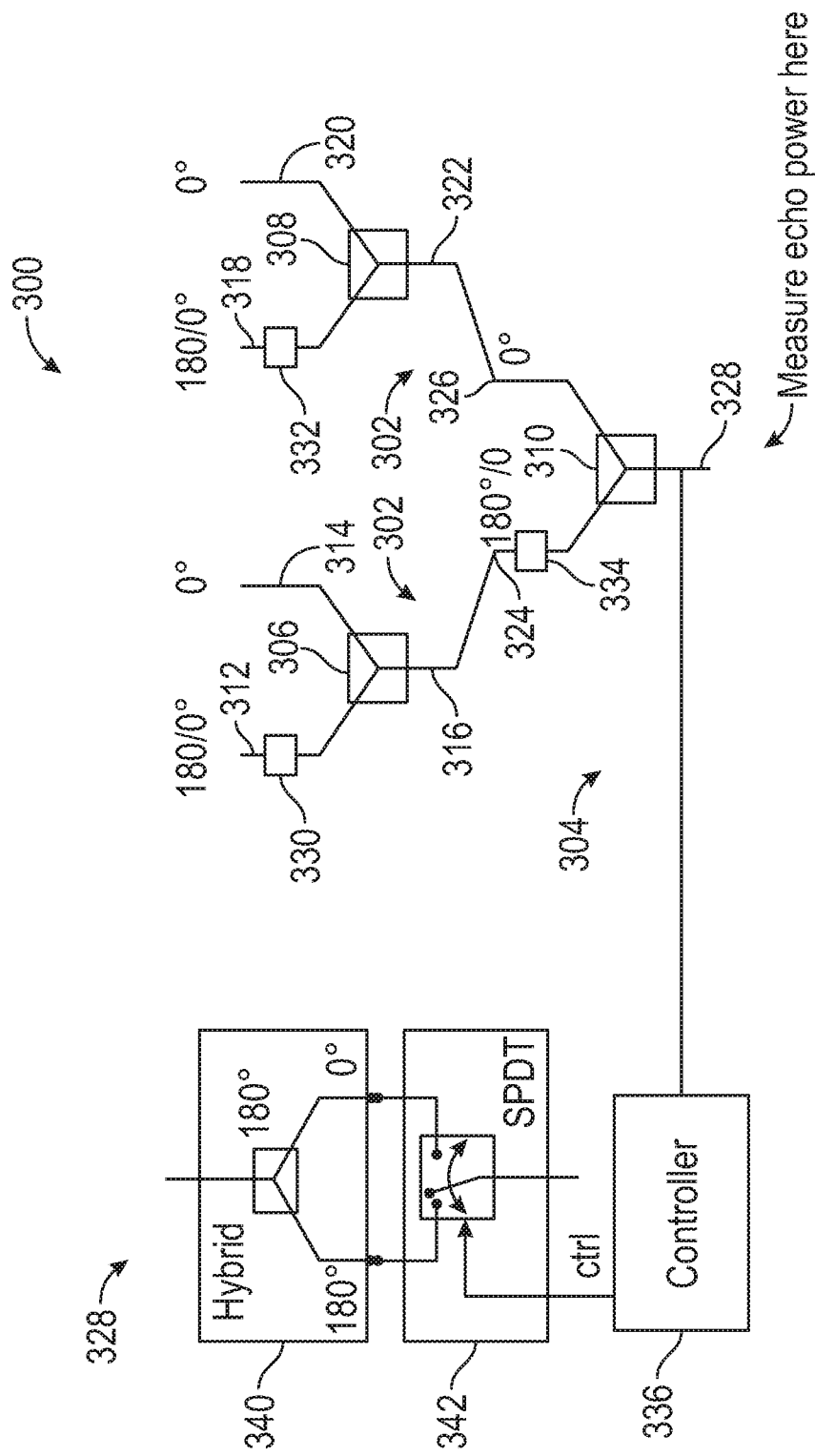
FIG. 3 shows a cancelation device.

FIG. 3 shows a cancelation device 300 consistent with embodiments of the disclosure. As shown in FIG. 3, cancelation device 300 may comprise a first level 302 and a second level 304. First level 302 may comprise a first combiner/splitter 306 and a second combiner/splitter 308. Second level 304 may comprise a third combiner/splitter 310. First combiner/splitter 306 may comprise first input port 312 of first combiner/splitter 306, a second input port 314 of first combiner/splitter 306, and an output port 316 of first combiner/splitter 306. Second combiner/splitter 308 may comprise a first input port 318 of second combiner/splitter 308, a second input port 320 of second combiner/splitter 308, and an output port 322 of second combiner/splitter 308. Third combiner/splitter 310 may comprise a first input port 324 of third combiner/splitter 310, a second input port 326 of third combiner/splitter 310, and an output port 328 of third combiner/splitter 310.

First combiner/splitter 306, second combiner/splitter 308, and third combiner/splitter 310 may each comprise two-way combiner/splitters. Output port 316 of first combiner/splitter 306 may be connected to first input port 324 of third combiner/splitter 310. Output port 322 of second combiner/splitter 308 may be connected to second input port 326 of third combiner/splitter 310. As such, first input port 312 of first combiner/splitter 306, second input port 314 of first combiner/splitter 306, first input port 318 of second combiner/splitter 308, and second input port 320 of second combiner/splitter 308 may comprise the output ports of an FDX node or FDX amplifier. Cancelation device 300 may combine US signals received from CPE at the aforementioned input ports and output the combined signal on output port 328 of third combiner/splitter 310.

A first phase shifter 330 may be disposed in first input port 312 of first combiner/splitter 306, a second phase shifter 332 may be disposed in first input port 318 of second combiner/splitter 308, and a third phase shifter 334 may be disposed in first input port 324 of third combiner/splitter 310. A controller 336 may be used to control first phase shifter 330, second phase shifter 332, and third phase shifter 334.

First phase shifter 330, second phase shifter 332, and third phase shifter 334 may each comprise a phase shifter 338. Phase shifter 338 may comprise a shifting element 340 and a switch 342. A control signal may be received by switch 342 from controller 336 to cause switch 342 to place shifting element 340 in a state to shift an incoming signal (e.g., shift 180°) or not to shift the incoming signal. In this way controller 336 may place cancelation device 300 in a plurality of configurations (e.g., the cases of FIG. 2), detect the total effective echo power at output port 328 of third combiner/splitter 310 for each of the plurality of configurations, select a one of the plurality of configurations that yields the lowest echo power, and place cancelation device 300 into the selected configuration.

Controller 336 may be practiced in hardware and/or in software (including firmware, resident software, microcode, etc.) or in any other circuits or systems. Controller 336 may be practiced in electrical circuits comprising discrete electronic elements, packaged or integrated electronic chips containing logic gates, a circuit utilizing a microprocessor, or on a single chip containing electronic elements or microprocessors. Controller 336 may also be practiced using other technologies capable of performing logical operations such as, for example, AND, OR, and NOT, including but not limited to, mechanical, optical, fluidic, and quantum technologies. As described in greater detail below with respect to FIG. 5, controller 336 may be practiced in a computing device 500.

Figure 4:
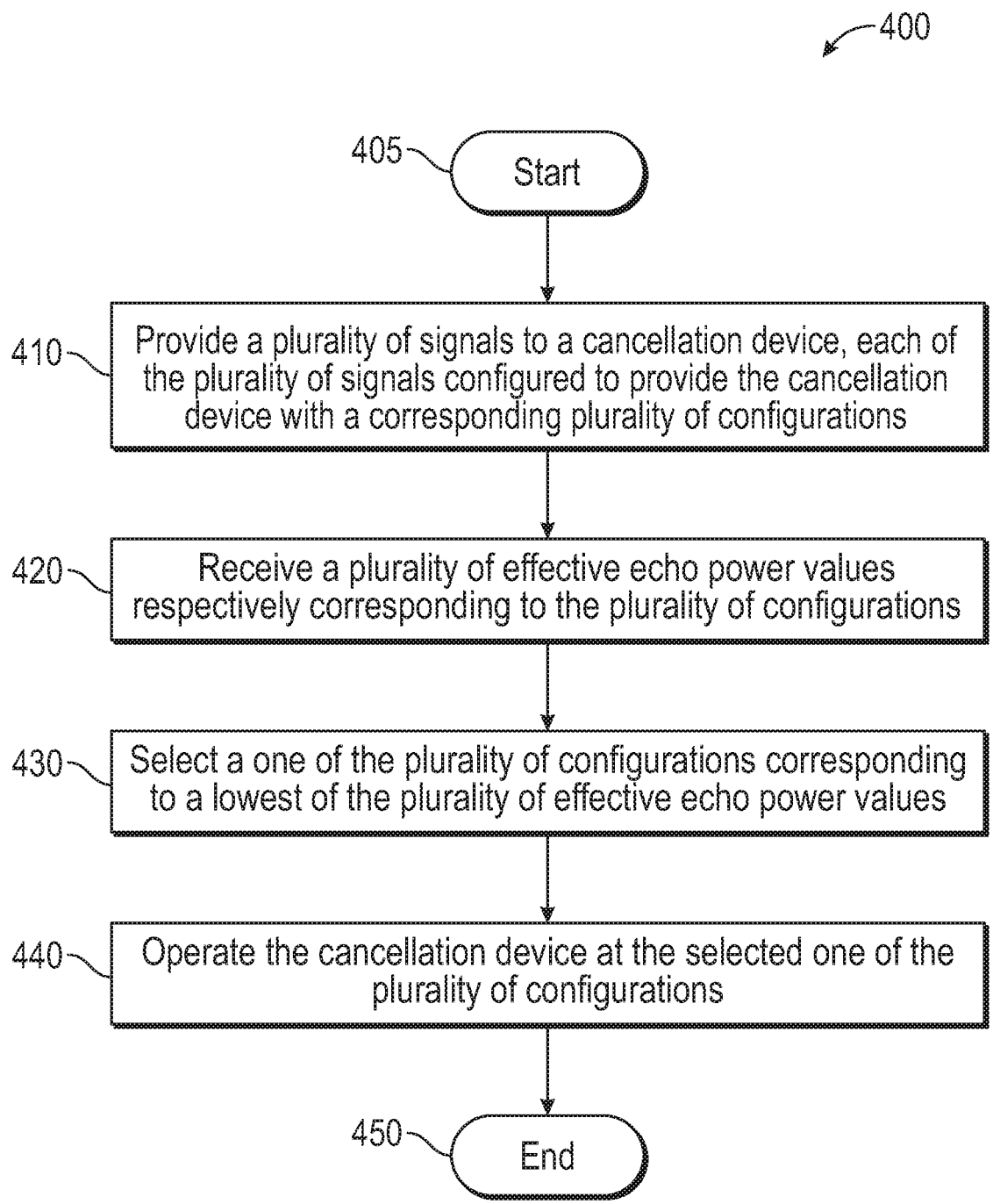
FIG. 4 is a flow chart of a method for providing echo cancellation in multiple port Full Duplex (FDX) nodes and amplifiers.

FIG. 4 is a flow chart setting forth the general stages involved in a method 400 consistent with an embodiment of the disclosure for providing echo cancellation in multiple port Full Duplex (FDX) nodes and amplifiers. Method 400 may be implemented using controller 336 as described in more detail above with respect to FIG. 3. Ways to implement the stages of method 400 will be described in greater detail below.

Method 400 may begin at starting block 405 and proceed to stage 410 where controller 336 may provide a plurality of signals to cancelation device 300. Each of the plurality of signals may be configured to provide cancelation device 300 with a respective corresponding plurality of configurations. For example, the plurality of signals may be provided by controller 336 to switch 342 located in each of first phase shifter 330, second phase shifter 332, and third phase shifter 334. The plurality of signals may cause switch 342 to place shifting element 340 in each of first phase shifter 330, second phase shifter 332, and third phase shifter 334 in a state to shift an incoming signal (e.g., shift 180°) or not to shift the incoming signal. The plurality of configurations that controller 336 may place cancelation device 300 into may comprise, but are not limited to, the eight cases shown in FIG. 2.

From stage 410, where controller 336 provides the plurality of signals to cancelation device 300, method 400 may advance to stage 420 where controller 336 may receive a plurality of effective echo power values respectively corresponding to the plurality of configurations. For example, for each of the plurality of configurations that controller 336 places cancelation device 300 into, controller 336 may measure the effective echo power value at output port 328 of third combiner/splitter 310. For each of the plurality of configurations, the phases of the echoes resulting from the multiple ports may be scrambled over 360 degree.

Once controller 336 receives the plurality of effective echo power values in stage 420, method 400 may continue to stage 430 where controller 336 may select a one of the plurality of configurations corresponding to a lowest of the plurality of effective echo power values. For example, while each of the plurality of configurations may scrabble the echoes so that they may not combine coherently, one of the plurality of configurations may do a better job as compared to the rest of the plurality of configurations. Embodiments of the disclosure may select this best configuration because it may have the lowest of the plurality of effective echo power values.

After controller 336 selects the one of the plurality of configurations in stage 430, method 400 may proceed to stage 440 where controller 336 may operate cancelation device 300 at the selected one of the plurality of configurations. For example, because the selected configuration may scrabble the echoes so that they may not combine coherently, controller 336 may operate cancelation device 300 with this configuration. Accordingly, embodiments of the disclosure may vary the phases of two way combiners/splitters, and for each phase combination, detect the total effective echo power at an FDX receiver, and select the phase combination that yields the lowest echo power. Controller 336 may repeat the process described with respect of FIG. 4 periodically because conditions may change and other ones of the plurality of configurations may be better. For example, the process described with respect of FIG. 4 may be repeated hourly or daily. Once controller 336 operates cancelation device 300 at the selected one of the plurality of configurations in stage 440, method 400 may then end at stage 450.

Figure 5:
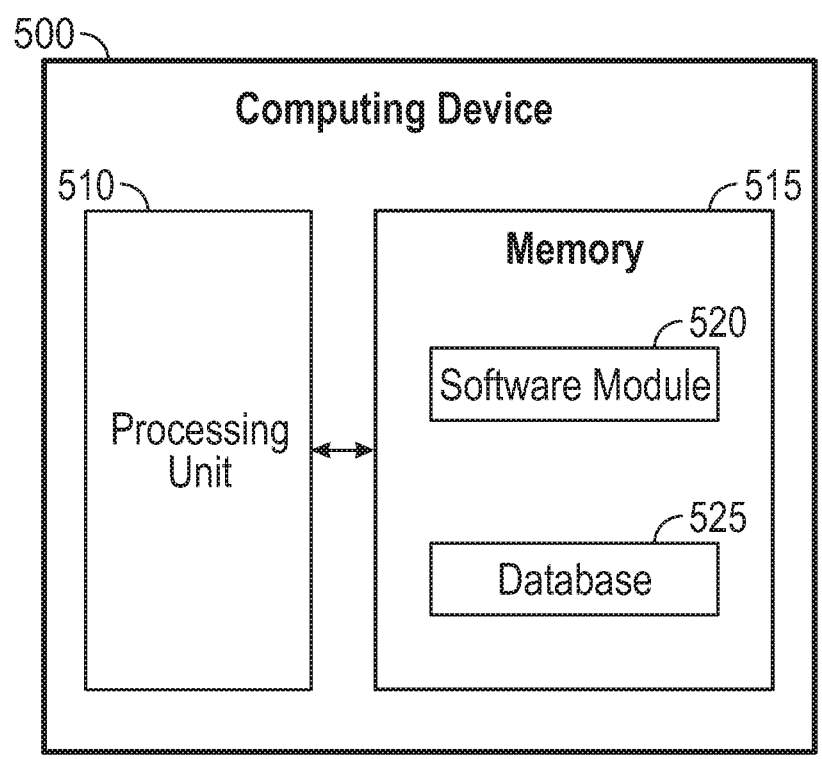
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing echo cancellation in multiple port Full Duplex (FDX) nodes and amplifiers, including for example, any one or more of the stages from method 400 described above with respect to FIG. 4. Computing device 500, for example, may provide an operating environment for controller 336. Controller 336 may operate in other environments and is not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
providing a plurality of signals to a cancelation device, wherein the cancelation device comprises a plurality of phase shifters, wherein the cancelation device comprises a first level comprising a first combiner/splitter and a second combiner/splitter and a second level comprising a third combiner/splitter being fed by the first combiner/splitter and the second combiner/splitter, wherein the plurality of phase shifters comprise a first phase shifter disposed in a first input port of the first combiner/splitter, a second phase shifter disposed in a first input port of the second combiner/splitter, and a third phase shifter disposed in a first input port of the third combiner/splitter, wherein each of the plurality of signals are configured to provide the cancelation device with one of a plurality of different configurations forth plurality of phase shifters, and wherein providing the plurality of signals to the cancelation device comprises:
  providing a first signal that causes a first switch of the first phase shifter of the plurality of phase shifters to place a first shifting element of the first phase shifter in a state to shift a first incoming signal to provide the cancelation device with a first configuration of the plurality of different configurations, and
  providing a second signal that causes a second switch of the second phase shifter of the plurality of phase shifters to place a second shifting element of the second phase shifter in another state to not shift a second incoming signal to provide the cancelation device with a second configuration of the plurality of different configurations, the second configuration being different than the first configuration;
  receiving an effective echo power value corresponding to each of the plurality of different configurations of the plurality of phase shifters;
  selecting, based on the effective echo power value corresponding to each of the plurality of different configurations of the plurality of phase shifters, a configuration from the plurality of different configurations of the plurality of phase shifters corresponding to a lowest effective echo power value for the cancelation device; and
  operating the cancelation device at the selected configuration one of the plurality of different configurations.

2. The method of claim 1, wherein each of the plurality of different configurations provide a different phase variation combination of the plurality of phase shifters disposed in input ports of the cancelation device.

3. The method of claim 1, wherein the plurality of phase shifters comprise a first phase shifter disposed in a first input port of the first combiner/splitter, a second phase shifter disposed in a first input port of the second combiner/splitter, and a third phase shifter disposed in a first input port of the third combiner/splitter.

4. The method of claim 1, wherein the plurality of phase shifters are configured to:
receive the plurality of signals; and
respectively place the cancelation device into the plurality of different configurations.

5. The method of claim 1, wherein the cancelation device is disposed in a receiver of one of the following: a Full Duplex (FDX) node and an FDX amplifier.

6. A system comprising:
a memory storage; and
a processing unit coupled to the memory storage, wherein the processing unit is configured to:
  provide a plurality of signals to a cancelation device, wherein the cancelation device comprises a plurality of phase shifters, wherein each of the plurality of signals are configured to provide the cancelation device with one of a plurality of different configurations of the plurality of phase shifters, wherein the plurality of phase shifters comprise a first phase shifter disposed in a first input port of a first combiner/splitter, a second phase shifter disposed in a first input port of a second combiner/splitter, and a third phase shifter disposed in a first input port of a third combiner/splitter and wherein the processing unit being operative to provide the plurality of signals to the cancelation device comprises the processing unit being configured to:
provide a first signal that causes a first switch of the first phase shifter of the plurality of phase shifters to place a first shifting element of the first phase shifter in a state to shift a first incoming signal to provide the cancelation device with a first configuration of the plurality of different configurations, and
provide a second signal that causes a second switch of the second phase shifter of the plurality of phase shifters to place a second shifting element of the second phase shifter in another state to not shift a second incoming signal to provide the cancelation device with a second configuration of the plurality of different configurations, the second configuration being different than the first configuration,
receive an effective echo power value corresponding to the plurality of different configurations of the plurality of phase shifters,
select, based on the effective echo power value corresponding to each of the plurality of different configurations of the plurality of phase shifters, a configuration from the plurality of different configurations of the plurality of phase shifters corresponding to a lowest effective echo power value for the cancelation device, and
operate the cancelation device at the selected configuration one of the plurality of different configurations.

7. The system of claim 6, wherein each of the plurality of different configurations provide a different phase variation combination of the plurality of phase shifters disposed at input ports of the cancelation device.

8. The system of claim 6, wherein the cancelation device comprises:
a first level comprising the first combiner/splitter and the second combiner/splitter; and
a second level comprising the third combiner/splitter being fed by the first combiner/splitter and the second combiner/splitter.

9. The system of claim 8, wherein:
the first combiner/splitter comprises the first input port of the first combiner/splitter, a second input port of the first combiner/splitter, and an output port of the first combiner/splitter;
the second combiner/splitter comprises the first input port of the second combiner/splitter, a second input port of the second combiner/splitter, and an output port of the second combiner/splitter;
the third combiner/splitter comprises the first input port of the third combiner/splitter, a second input port of the third combiner/splitter, and an output port of the third combiner/splitter;
the output port of the first combiner/splitter is connected to the first input port of third combiner/splitter and the output port of second combiner/splitter is connected to the second input port of third combiner/splitter.

10. The system of claim 6, wherein the plurality of phase shifters are configured to:
receive the plurality of signals; and
respectively place the cancelation device into the plurality of different configurations.

11. A non-transitory computer-readable medium that stores a set of instructions which when executed perform method executed by the set of instructions comprising:
providing a plurality of signals to a cancelation device, wherein the cancelation device comprises a plurality of phase shifters, wherein the cancelation device comprises a first level comprising a first combiner/splitter and a second combiner/splitter and a second level comprising a third combiner/splitter being fed by the first combiner/splitter and the second combiner/splitter, wherein the plurality of phase shifters comprise a first phase shifter disposed in a first input port of the first combiner/splitter, a second phase shifter disposed in a first input port of the second combiner/splitter, and a third phase shifter disposed in a first input port of the third combiner/splitter, wherein each of the plurality of signals are configured to provide the cancelation device with one of a plurality of different configurations of the plurality of phase shifters, and wherein providing the plurality of signals to the cancelation device comprises:
providing a first signal that causes a first switch of the first phase shifter of the plurality of phase shifters to place a first shifting element of the first phase shifter in a state to shift a first incoming signal to provide the cancelation device with a first configuration of the plurality of different configurations, and
providing a second signal that causes a second switch of the second phase shifter of the plurality of phase shifters to place a second shifting element of the second phase shifter in another state to not shift a second incoming signal to provide the cancelation device with a second configuration of the plurality of different configurations, the second configuration being different than the first configuration;
receiving an effective echo power value corresponding to the plurality of different configurations of the plurality of phase shifters;
selecting, based on the effective echo power value corresponding to each of the plurality of different configurations of the plurality of phase shifters, a configuration from the plurality of different configurations of the plurality of phase shifters corresponding to a lowest effective echo power value for the cancelation device; and
operating the cancelation device at the selected configuration of the plurality of different configurations.

12. The non-transitory computer-readable medium of claim 11, wherein each of the plurality of different configurations provide a different phase variation combination of the plurality of phase shifters disposed at input ports of the cancelation device.

13. The non-transitory computer-readable medium of claim 11, wherein the plurality of phase shifters comprise a first phase shifter disposed in a first input port of the first combiner/splitter, a second phase shifter disposed in a first input port of the second combiner/splitter, and a third phase shifter disposed in a first input port of the third combiner/splitter.

14. The non-transitory computer-readable medium of claim 11, wherein the plurality of phase shifters are configured to:
receive the plurality of signals; and
respectively place the cancelation device into the plurality of different configurations.

15. The non-transitory computer-readable medium of claim 11, wherein the cancelation device is disposed in a receiver of one of the following: a Full Duplex (FDX) node and an FDX amplifier.

16. The non-transitory computer-readable medium of claim 11, wherein:

the first combiner/splitter comprises a first input port of the first combiner/splitter, a second input port of the first combiner/splitter, and an output port of the first combiner/splitter;

the second combiner/splitter comprises a first input port of the second combiner/splitter, a second input port of the second combiner/splitter, and an output port of the second combiner/splitter;

the third combiner/splitter comprises a first input port of the third combiner/splitter, a second input port of the third combiner/splitter, and an output port of the third combiner/splitter;

the output port of the first combiner/splitter is connected to the first input port of third combiner/splitter and the output port of second combiner/splitter is connected to the second input port of third combiner/splitter.

17. The non-transitory computer-readable medium of claim 11, wherein the first input port of the first combiner/splitter, the second input port of the first combiner/splitter, the first input port of the second combiner/splitter, and the second input port of the second combiner/splitter comprise output ports of a Full Duplex (FDX) node or FDX amplifier.

* * * * *